United States Patent
Bastide et al.

(10) Patent No.: US 10,423,719 B2
(45) Date of Patent: Sep. 24, 2019

(54) DYNAMIC LOADING OF TABULAR DATA

(71) Applicant: International Business Machines Corporation, Armonk, NY (US)

(72) Inventors: Paul R. Bastide, Boxford, MA (US); Matthew E. Broomhall, South Burlington, VT (US); Robert E. Loredo, North Miami Beach, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1027 days.

(21) Appl. No.: 13/770,312

(22) Filed: Feb. 19, 2013

(65) Prior Publication Data
US 2014/0237340 A1 Aug. 21, 2014

(51) Int. Cl.
*G06F 17/30* (2006.01)
*G06F 17/24* (2006.01)

(52) U.S. Cl.
CPC ...... *G06F 17/246* (2013.01); *G06F 17/30893* (2013.01); *G06F 17/30902* (2013.01)

(58) Field of Classification Search
CPC . G06F 17/246; G06F 17/2264; G06F 17/2241
See application file for complete search history.

(56) References Cited

U.S. PATENT DOCUMENTS

| | | | | |
|---|---|---|---|---|
| 5,570,355 | A * | 10/1996 | Dail | H04L 12/6418 370/352 |
| 6,157,934 | A * | 12/2000 | Khan | G06Q 10/10 709/203 |
| 6,460,059 | B1 * | 10/2002 | Wisniewski | G06F 17/246 715/205 |
| 6,948,154 | B1 * | 9/2005 | Rothermel | G06F 17/246 717/128 |
| 6,988,241 | B1 | 1/2006 | Guttman et al. | |
| 7,549,115 | B2 | 6/2009 | Kotler et al. | |
| 7,984,371 | B2 | 7/2011 | Zdenek | |
| 2002/0135796 | A1* | 9/2002 | Alexander | G06Q 40/04 358/1.15 |
| 2004/0172592 | A1* | 9/2004 | Collie | G06F 17/2229 715/212 |
| 2005/0044524 | A1* | 2/2005 | Murray | G06F 9/44526 717/101 |
| 2007/0168323 | A1* | 7/2007 | Dickerman | G06F 17/30489 |
| 2007/0220415 | A1* | 9/2007 | Cheng | G06F 15/00 715/212 |
| 2009/0064194 | A1* | 3/2009 | Turk | G06F 9/5027 719/319 |
| 2011/0314365 | A1* | 12/2011 | Messerly | G06F 17/246 715/219 |

(Continued)

*Primary Examiner* — Scott T Baderman
*Assistant Examiner* — Mario M Velez-Lopez
(74) *Attorney, Agent, or Firm* — Cuenot, Forsythe & Kim, LLC

(57) ABSTRACT

Dynamic data loading of tabular data includes identifying a plurality of formulas within tabular data of a document, wherein the tabular data is arranged in cells. Using a processor, a hierarchy for the tabular data is determined according to cell dependencies defined in the formulas. Each of a plurality of different portions of the document is sent from a first computing system to a second computing system in an order determined from the hierarchy.

20 Claims, 3 Drawing Sheets

(56) References Cited

U.S. PATENT DOCUMENTS

| | | | |
|---|---|---|---|
| 2012/0023101 A1* | 1/2012 | Heimendinger | G06F 17/30522 707/737 |
| 2012/0042242 A1 | 2/2012 | Garland et al. | |
| 2013/0110884 A1* | 5/2013 | Eakins | G06F 17/246 707/809 |
| 2013/0263012 A1* | 10/2013 | Stallings | G06F 17/30058 715/748 |
| 2014/0164896 A1* | 6/2014 | Schlereth | G06F 17/246 715/217 |

* cited by examiner

300

| | 1 | 2 | 3 | 4 | 5 |
|---|---|---|---|---|---|
| A | =sum(A2:A5) | d | d | d | d |
| B | =sum(B2:B5) | d | d | d | d |
| C | =sum(A1:B1) | d | d | d | d |

US 10,423,719 B2

DYNAMIC LOADING OF TABULAR DATA

BACKGROUND

The use of online editors to create and edit documents has become commonplace. An online editor is a data processing system executing a server-side program that allows an end-user to view, create, or modify a document, whether a word processing document, a spreadsheet, a presentation, a drawing, etc. The server-side program executed by the online editor typically is implemented as a Web-based application. The end-user accesses the Web-based application and, as such, the document, through a client executing a browser.

While many online editors are able to provide an end-user experience that, in some respects, rivals a conventional client-based application, limitations still exist. As an example, most online spreadsheet editors are restricted in the number of columns and rows that can be included in a document to a greater degree than their client-based counterparts. These limitations often are imposed not only to maintain a suitable level of performance for the online editor, but also to provide end-users with a responsive feel during use.

BRIEF SUMMARY

A method includes identifying a plurality of formulas within tabular data of a document, wherein the tabular data is arranged in cells, and determining, using a processor, a hierarchy for the tabular data according to cell dependencies defined in the formulas. The method further includes sending each of a plurality of different portions of the document from a first computing system to a second computing system in an order determined from the hierarchy.

A system includes a processor programmed to initiate executable operations. The executable operations include identifying a plurality of formulas within tabular data of a document, wherein the tabular data is arranged in cells, and determining a hierarchy for the tabular data according to cell dependencies defined in the formulas. The executable operations further include sending each of a plurality of different portions of the document from a first computing system to a second computing system in an order determined from the hierarchy.

A computer program product includes a computer readable storage medium having program code stored thereon. The program code is executable by a processor to perform a method. The method includes identifying, using the processor, a plurality of formulas within tabular data of a document, wherein the tabular data is arranged in cells, and determining, using the processor, a hierarchy for the tabular data according to cell dependencies defined in the formulas. The method further includes sending, using the processor, each of a plurality of different portions of the document from a first computing system to a second computing system in an order determined from the hierarchy.

DETAILED DESCRIPTION

Figure 1:
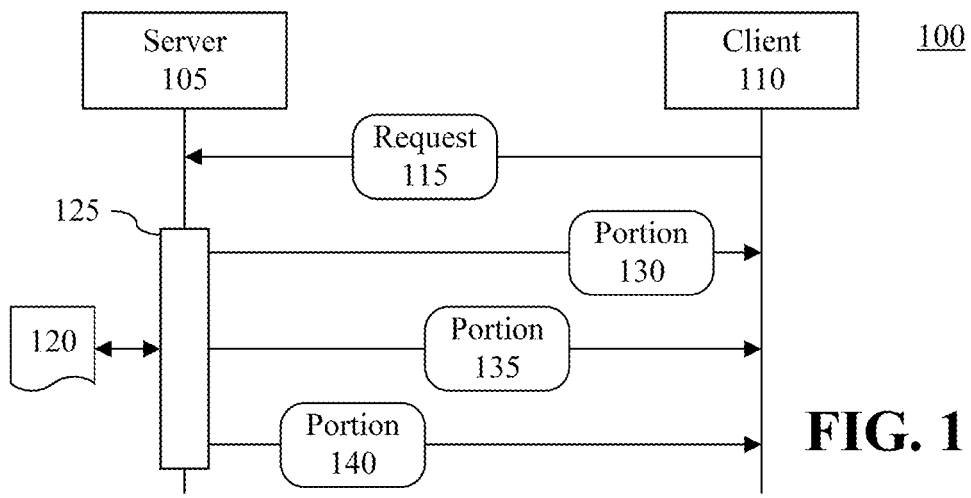
FIG. 1 is a block diagram of an exemplary computing environment including a server and a client.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This specification relates to online editors and, more particularly, to an online editor configured to process documents that include tabular data. In accordance with the inventive arrangements disclosed herein, an online editor performs an analysis upon an electronic document (hereafter "document"). The analysis can be performed responsive to any of a variety of different trigger events. Different portions of the document are sent to a client system in an order that is determined from the analysis performed.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 is a block diagram of an exemplary computing environment 100 including a server 105 and a client 110. Computing environment 100 implements an example of a client-server model. Each of server 105 and client 110 are implemented as data processing systems. Server 105 executes suitable operating system and server-side software such as a Web-application. As such, server 105 is configured to respond to requests issued from client 110. Client 110 executes a suitable operating system and client-side software such as a browser.

Both server 105 and client 110 are communicatively linked via a network (not shown). The network can be implemented as, or include, any of a variety of different networks such as a WAN, a LAN, a wireless network, a mobile network, a Virtual Private Network (VPN), the Internet, the Public Switched Telephone Network (PSTN), or the like.

Server 105 implements an online editor. The phrase "online editor," as used herein, refers to a data processing system executing an application for processing electronic documents. The online editor allows an end-user, working through a client, to create, modify, or view a document. In this example, the application executed by server 105 is a Web-application. Accordingly, an end-user of client 110 accesses the online editor implemented by server 105 through the network using a browser executing within client 110.

In operation, client 110 issues a request 115 to server 105. Request 115 specifies a particular document, i.e., document 120, for which access is requested. Document 120 includes tabular data. In one aspect, document 120 is non-tabular in nature, e.g., is a word processing document, but includes at least some tabular data. In another aspect, document 120 is a file formed entirely of tabular data, e.g., is a spreadsheet.

Tabular data refers to individual data elements that are arranged in one or more rows and one or more columns. An individual data element within tabular data is referred to as a "cell." The term "cell," as used within this specification, is a particular data element that is uniquely identified by the column in which the cell resides and the row in which the cell resides. The term "cell" is not intended to imply any particular type of tabular data structure. Examples of tabular data include tables, spreadsheets, pivot tables, filtered data, and the like.

Responsive to request 115, server 105 implements an analysis 125 of document 120. Based upon analysis 125, server 105 sends different portions, e.g., portions 130, 135, and 140, of document 120 to client 110. The order in which portions 130-140 are sent to client 110 is determined from analysis 125.

Figure 2:
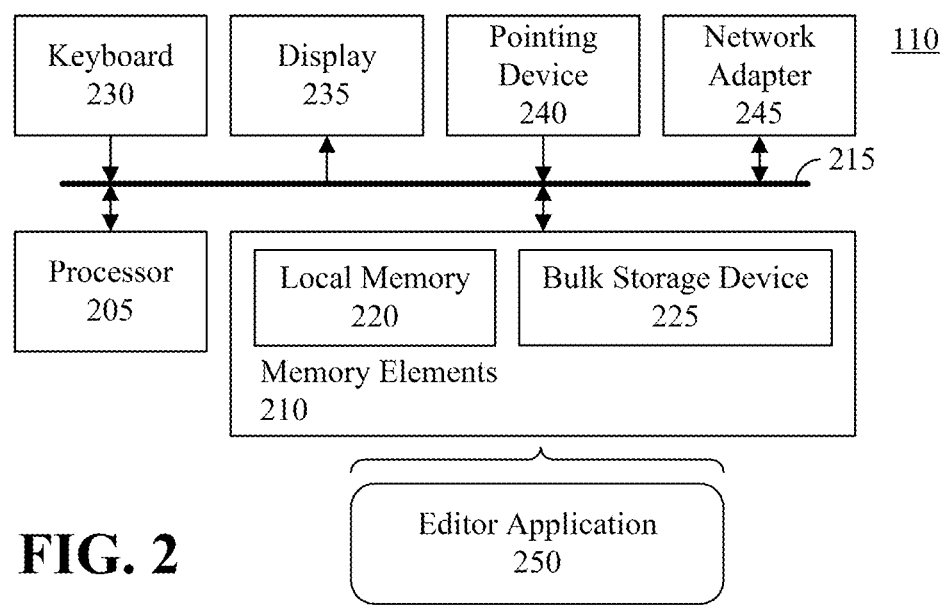
FIG. 2 is a block diagram illustrating an example of the server of FIG. 1.

FIG. 2 is a block diagram illustrating an example of server 105 of FIG. 1. In one aspect, server 105 includes at least one processor (e.g., a central processing unit) 205 coupled to memory elements 210 through a system bus 215 or other suitable circuitry. As such, server 105 can store program code within memory elements 210. Processor 205 executes the program code accessed from memory elements 210 via system bus 215 or the other suitable circuitry.

In one aspect, server 105 is implemented as a computer or other programmable data processing apparatus that is suitable for storing and/or executing program code. It should be appreciated, however, that server 105 can be implemented in the form of any system including a processor and memory that is capable of performing and/or initiating the functions and/or operations described within this specification.

Memory elements 210 include one or more physical memory devices such as, for example, local memory 220 and one or more bulk storage devices 225. Local memory 220 refers to RAM or other non-persistent memory device(s) generally used during actual execution of the program code. Bulk storage device(s) 225 can be implemented as a hard disk drive (HDD), solid state drive (SSD), or other persistent data storage device. Server 105 also can include one or more cache memories (not shown) that provide temporary storage of at least some program code in order to reduce the number of times program code must be retrieved from bulk storage device 225 during execution.

Input/output (I/O) devices such as a keyboard 230, a display 235, and a pointing device 240 optionally can be coupled to server 105. The I/O devices can be coupled to server 105 either directly or through intervening I/O controllers. One or more network adapters 245 also can be coupled to server 105 to enable server 105 to become coupled to other systems, computer systems, remote printers, and/or remote storage devices through intervening private or public networks. Modems, cable modems, wireless transceivers, and Ethernet cards are examples of different types of network adapters 245 that can be used with server 105.

As pictured in FIG. 2, memory elements 210 store an editor application 250. Editor application 250, being implemented in the form of executable program code, is executed by server 105 and, as such, is considered an integrated part of system 105. Editor application 250 is a server-side program such as a Web-application. Server 105, while executing editor application 250, performs the various operations described herein such as process 125 of FIG. 1 as previously described. Editor application 250, including any parameters and/or attributes utilized by editor application 250, e.g., document 120 or portions thereof, any derivative data structures such as a hierarchy, etc. are functional data structures that impart functionality when employed as part of server 105.

In another aspect, FIG. 2 is an exemplary implementation of client 105. Client 105 can be implemented substantially as described, with the exception that client 105 executes a browser as opposed to editor application 250. In general, when implementing a client 105, the data processing system represented by FIG. 2 can be implemented in any of a variety of different form factors including, but not limited to, a portable device such as a mobile communication device, a tablet computing and/or communication device, a laptop computing device, a desktop computing device, a server, or the like.

Figures 3, 4:
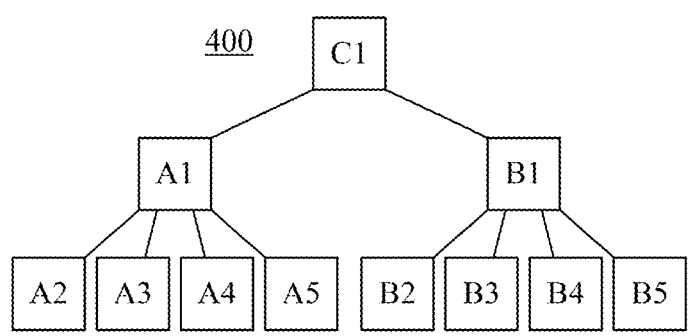
FIG. 3 is a block diagram illustrating an example of tabular data.
FIG. 4 is a block diagram illustrating an example of a hierarchy determined from the tabular data of FIG. 3.

FIG. 3 is a block diagram illustrating an example of tabular data 300. Tabular data 300 represents standalone data, e.g., a file, or data that is included in another, larger document. In either case, exemplary implementations of tabular data 300 include a table, a pivot table, filtered data, a spreadsheet, or the like.

As shown, each of cells A1, B1, and C1 includes a formula. A "formula," as used herein, is an expression within a cell that is dependent upon, i.e., uses or references, at least one other cell. Cells referenced in a formula need not be on the same page or sheet, but can be located on one or more other sheets of a multi-sheet set of tabular data. The remaining cells include data represented by "d" in each cell. Cells having the letter "d" indicating data elements are not dependent upon any other cells. The formula in cell A1 is dependent upon cells A2, A3, A4, and A5. The formula in cell B1 is dependent upon cells B2, B3, B4, and B5. The formula in cell C1 is dependent upon cells A1 and B1 and, as such, all cells upon which cells A1 and B1 depend.

FIG. 4 is a block diagram illustrating an example of a hierarchy 400 determined from tabular data 300 of FIG. 3. In one aspect, an online editor, e.g., server 105, analyzes tabular data 300. In performing the analysis, the online editor identifies each formula included within tabular data 300. From the formulas, dependencies are identified among the various cells. The online editor determines, or generates, hierarchy 400 for tabular data 300 using the identified formulas.

Hierarchy 400 is generally constructed of nodes arranged in parent-child relationships. For purposes of illustration, each node of hierarchy 400 corresponds to a cell of tabular data 300. Each parent node is dependent upon the child nodes beneath. In this example, node C1 is at a top level of the hierarchy. Node C1 depends on each of nodes A1 and B1, which are child nodes of node C1. Node A1 depends upon nodes A2, A3, A4, and A5, which are child nodes of node A1. Nodes A2, A3, A4, and A5 are located in the bottom row of the hierarchy. Node B1 depends upon nodes B2, B3, B4, and B5, which are child nodes of B1. Notes B2, B3, B4, and B5 are located in the bottom row of the hierarchy.

The online editor can send different portions of tabular data to the requesting client based upon hierarchy 400. Thus, the tabular data is populated in the client, e.g., is presented on a display of the client, in the order in which the online editor sends the various portions of the tabular data. In one aspect, the online editor can send different levels of the hierarchy in an order determined by the hierarchy. For example, a selected row of hierarchy 400 can be sent, then another selected row, etc. In illustration, the top row of hierarchy 400 including node C1 can be sent first. Next, the second row of hierarchy 400 including nodes A1 and B1 can be sent. Finally the remaining nodes formed of A2, A3, A4, and A5 and B2, B3, B4, and B5 of hierarchy 400 can be sent.

The prior example presumes that nodes (or cells) located in top levels of the hierarchy, e.g., the first row, are more contextually relevant for a user than nodes located in the bottom levels of the hierarchy, e.g., the third row. For example, the value of cell C1 likely provides an end-user with greater context or useful data for a given document than providing one or more of nodes A2, A3, A4, A5, B2, B3, B4, or B5. As such, the value of C1 is sent first and displayed within the client first prior to other cells.

Figure 5:
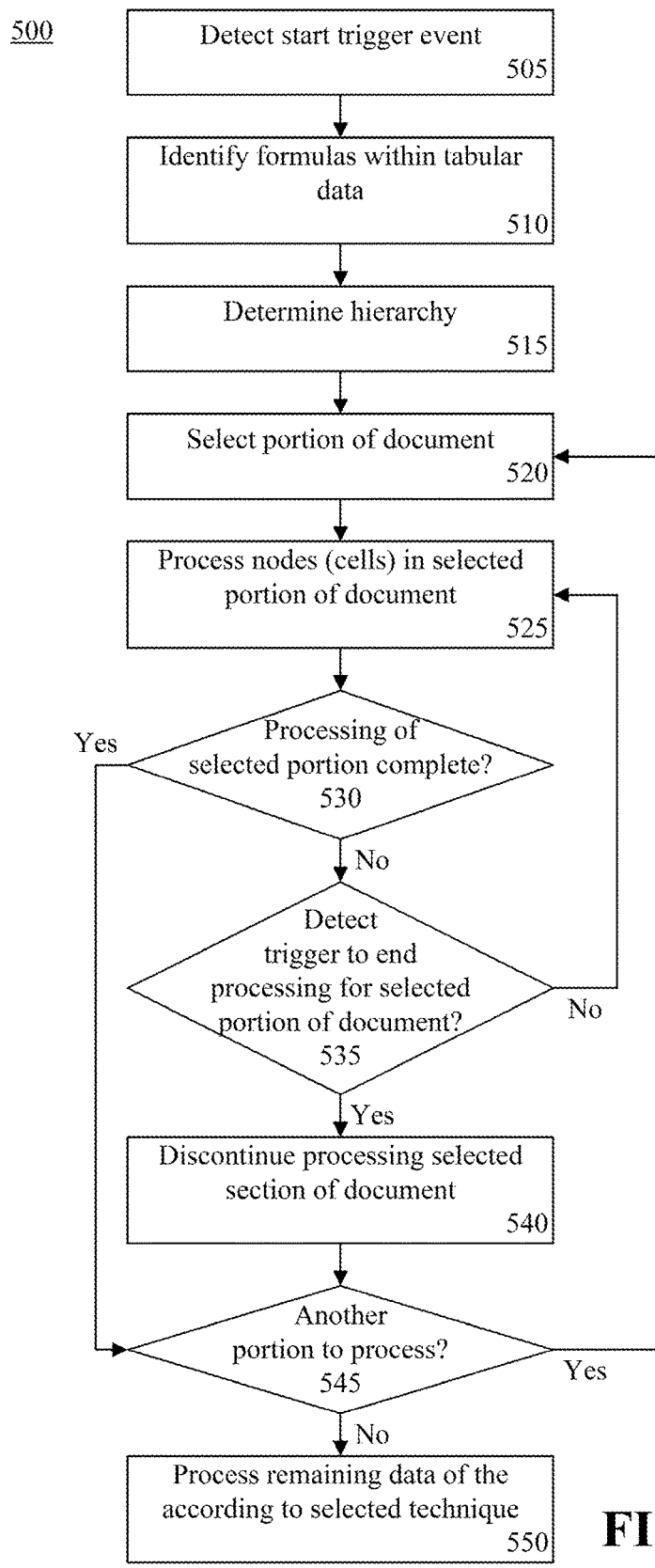
FIG. 5 is a flow chart illustrating an exemplary method of processing a document including tabular data.

FIG. 5 is a flow chart illustrating an exemplary method 500 of processing a document including tabular data. Method 500 can be performed by an online editor as described with reference to FIGS. 1-4 of this specification. Method 500 can begin in block 505, where a start trigger event is detected. Detection of a start trigger event causes the online editor to begin an analysis of a document.

In one aspect, the start trigger event is a request received from a client to access a document. Other examples of triggers include, but are not limited to, an online editor performing an action on a document that is already open in which a refresh of the displayed cells is required, loading the document into the online editor, saving the document within the online editor, closing the document in the online editor, the expiration of a predetermined amount of time, the size of a document that is to be loaded or opened. In other examples, the analysis can be performed periodically, responsive to a user request, or responsive to detection of a user-defined start trigger event as may be specified through a Macro language or other extension within the browser of the client.

In block 510, the online editor, responsive to detecting the start trigger event in block 505, begins analyzing a document. Depending upon the particular situation, the document that is analyzed in one that is already open or is one that is identified from a request received from a client, e.g., determined from the start trigger event.

In any case, in block 510, the online editor identifies formulas within the tabular data of the document. For example, the online editor scans through the document object model of the document to identify any formulas contained therein. In block 515, the online editor determines a hierarchy of the tabular data as illustrated and described with reference to FIG. 4. The online editor determines the hierarchy according to cell dependencies identified within the formulas.

In block 520, the online editor selects a particular portion of the document for processing. In one example, each portion is a level of the hierarchy that is generated in block 515. As such, each portion, or in this case level, includes at least one cell, but may include more than one cell. In one aspect, the online editor begins at the top level node, or root, of the hierarchy. As such, the root level node of the hierarchy is selected first. In another aspect, the online editor begins at the bottom level of the hierarchy, e.g., the leaf nodes or leaf level nodes. As such, the bottom level, or leaves, of the hierarchy are selected first.

In block 525, the online editor processes the nodes in the selected portion of the document. As noted, in one example, the selected portion of the document is each cell in a selected level of the hierarchy determined in block 515. In one aspect, the nodes of the selected level of the hierarchy are processed, or sent, concurrently, e.g., in parallel. In another aspect, the nodes of the selected level of the hierarchy are processed or sent serially.

In one aspect, the selected portion of the document is sent from the online editor to the client with a constant data rate. In another aspect, the selected portion of the document is sent from the online editor to the client with a variable data rate. For example, the online editor can send data to the client using a hyperbolic load technique in which a larger amount of data is sent at the start of the sending operation and smaller amounts of data are sent later in the sending operation. As time continues, less data is transmitted and, as such, the data rate decreases for the selected portion of the document.

In block 530, the online editor determines whether processing of the selected portion of the document is complete. The online editor determines whether all cells of the selected portion of the document have been sent to the client. If so, method 500 continues to block 545. If not, method 500 proceeds to block 535.

In block 535, the online editor determines whether a further trigger event is detected to end processing of the selected portion of the document. In one aspect, the further trigger event is the expiration of a predetermined amount of time from the start of processing of the selected portion without having sent an entirety of the selected portion of the document. Responsive to detecting a trigger event to end processing of the selected portion, method 500 continues to block 540. If a trigger event to end processing of the selected portion is not detected, method 500 loops back to block 525 to continue processing individual cells, or nodes, of the selected portion of the document.

For example, after the expiration of a predetermined amount of time for the selected level of the hierarchy, the online editor can stop sending cells of the selected level and begin to process cells of a different, or next, selected level of the hierarchy, e.g., a different portion of the document. This allows the online editor to send a wider variety of cells without getting "bogged" down or otherwise spending too much time for a given level of the hierarchy. In effect, the same amount of time can be spend processing each level of the hierarchy before moving on to a next level.

In block 540, the online editor discontinues processing of the selected section off the document. For example, the online editor stops sending cells of the selected section to the client.

In block 545, the online editor determines whether another portion of the document remains to be processed. For example, the online editor determines whether the document includes any further levels of the hierarchy that have not been processed or, more particularly, sent to the client. If so, method 500 loops back to block 520. If not, method 500 continues to block 550.

In one aspect, if each level has been processed at least one time, any levels that were not fully processed can be selected for processing in further iterations of method 500. Method 500 can iterate by continually selecting previously processed levels with cells remaining that have not been sent until the level is fully processed, while still observing any time limitations for processing levels.

In block 550, the online editor processes the remaining portions of data for the document. For example, any remaining cells not yet processed can be sent to the client. In one aspect, method 500, using the hierarchy described, sends cells containing formulas, cells that are part of pivot tables, a filter, or the like prior to other cells. Any remaining cells in block 550 are cells that are not included or specified in the hierarchy. Thus, for each of the remaining cells, no other cells of the document depend upon the cells.

In another aspect, if method 500 does not iterate to process levels of the hierarchy that were not full processed prior to the occurrence of a trigger event causing the online editor to move to a different level, the remainder of such levels can be processed in block 550. For example, the online editor would iterate through each level and visit each level only one time. Any remaining, or unprocessed, cells of the level would be processed in block 550 with other remaining cells of the tabular data.

The remaining portions of the tabular data can be processed using a selected delivery technique. In one example, the remaining cells are sent in groups of "N" cells at a time, where "N" is an integer value. The value of "N" can be selected by a system administrator of the online editor or an end-user in a preference entered through the client. In another example, the delivery technique can depend upon the particular type of device of the client. For example, the device type can specify the screen size and/or resolution so that only the amount of data needed to fill the screen of the client is sent.

The online editor further can load portions of the user interface using a prioritization scheme. In one example, any header text included in the document is loaded with priority. In another example, the remaining data can be sent to the client using a prioritization scheme that depends upon the proximity of the cells to a formula. Those cells immediately next to a cell with a formula can be loaded prior to cells that are located one or more cells away from a cell with a formula, whether horizontal, diagonal, or vertical. For example, the cells immediately next to a selected cell in the highest level of the hierarchy can be sent first, followed by cells separated from the selected cell by one cell, followed by cells separated by the selected cell by two cells, etc. The technique can continue until cells located "M" cells from the selected cell are populated, where M is an integer value of one (1) or more. After reaching M, the online editor can select a different cell in the same level of the hierarchy or a cell from a next lower level in the hierarchy and repeat until cells separated from the selected cell by M cells are populated. The technique can iterate as may be required. For example, remaining cells can be sent in order to populate the document viewed by the client starting from populated rows and columns moving outward in every direction.

In still another aspect, the remaining data is sent from the online editor to the client. The remaining data can be sent to the client until a maximum number of cells, columns, and/or rows is reached. When the maximum number is reached, the online editor can stop sending tabular data for the document to the client.

In yet another aspect, for any cells that are sent, row and/or column headers (hereafter "header" or "headers") for the cells can be sent. A header of a cell means that the cell is located within either a same row or a same column as the header. The header(s) can be sent with the cells. Sending a header with a cell means sending a header concurrently with at least one cell located in the same row and/or column as the header, sending the header immediately prior to sending the at least one cell in the same row and/or column as the header, or sending the header immediately after sending at least one cell in the same row and/or column as the header and prior to sending any cells of a different portion of the document or other level of the hierarchy.

The one or more embodiments disclosed within this specification provide for the analysis of a document including tabular data. The tabular data can be sent or presented, in a client-server environment, according to a hierarchy of the formulas identified within the tabular data. Various trigger events can be detected that control how much of any portion of the tabular data is sent or loaded before a next portion of the tabular data is processed, e.g., sent to the client.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A computer-implemented method, comprising:
   identifying a plurality of formulas within tabular data of a document, wherein the tabular data is arranged in cells;
   determining, using a hardware processor, a hierarchy for the tabular data according to cell dependencies defined in the formulas; and
   sending each of a plurality of different portions of the document from a first computing system to a second computing system in an order determined from the hierarchy.

2. The method of claim 1, wherein the document is a spreadsheet.

3. The method of claim 1, wherein a portion of the document defined by a root level of the hierarchy is sent first.

4. The method of claim 1, wherein a portion of the document defined by a leaf level of the hierarchy is sent first.

5. The method of claim 1, wherein at least one portion of the document is sent at a time varying rate.

6. The method of claim 1, wherein sending comprises:
   sending a selected portion of the document; and
   responsive to detecting a trigger event for the selected portion, discontinuing the sending of the selected portion and sending a different portion of the document.

7. The method of claim 6, wherein the trigger event is an expiration of a predetermined amount of time prior to having sent an entirety of the selected portion of the document.

8. The method of claim 1, further comprising:
identifying a header in the document; and
sending the header with a cell located in a row or a column of the header.

9. A computer hardware system, comprising:
a hardware storage device having program code stored therein, and
a hardware processor programmed with the program code to perform the following executable operations:
identifying a plurality of formulas within tabular data of a document, wherein the tabular data is arranged in cells;
determining a hierarchy for the tabular data according to cell dependencies defined in the formulas; and
sending each of a plurality of different portions of the document from a first computing system to a second computing system in an order determined from the hierarchy.

10. The system of claim 9, wherein the document is a spreadsheet.

11. The system of claim 9, wherein a portion of the document defined by a root level of the hierarchy is sent first.

12. The system of claim 9, wherein a portion of the document defined by a leaf level of the hierarchy is sent first.

13. The system of claim 9, wherein at least one portion of the document is sent at a time varying rate.

14. The system of claim 9, wherein sending comprises:
sending a selected portion of the document; and
responsive to detecting a trigger event for the selected portion, discontinuing the sending of the selected portion and sending a different portion of the document.

15. The system of claim 14, wherein the trigger event is an expiration of a predetermined amount of time prior to having sent an entirety of the selected portion of the document.

16. The system of claim 9, further comprising:
identifying a header in the document; and
sending the header with a cell located in a row or a column of the header.

17. A computer program product, comprising
a computer readable hardware storage device having program code stored thereon,
the program code executable by a hardware processor to perform:
identifying a plurality of formulas within tabular data of a document, wherein the tabular data is arranged in cells;
determining a hierarchy for the tabular data according to cell dependencies defined in the formulas; and
sending each of a plurality of different portions of the document from a first computing system to a second computing system in an order determined from the hierarchy.

18. The computer program product of claim 17, wherein a portion of the document is defined by a root level of the hierarchy is sent first.

19. The computer program product of claim 17, wherein at least one portion of the document is sent at a time varying rate.

20. The computer program product of claim 19, wherein sending comprises:
sending a selected portion of the document; and
responsive to detecting a trigger event for the selected portion, discontinuing the sending of the selected portion and sending a different portion of the document.

* * * * *